US012049785B2

(12) United States Patent
Kinsella

(10) Patent No.: US 12,049,785 B2
(45) Date of Patent: Jul. 30, 2024

(54) WINDOW FRAME VENTILATOR

(71) Applicant: ARCONIC TECHNOLOGIES LLC, Pittsburgh, PA (US)

(72) Inventor: Paul Kinsella, Runcorn (GB)

(73) Assignee: ARCONIC TECHNOLOGIES LLC, Pittsburgh, PA (US)

( * ) Notice: Subject to any disclaimer, the term of this patent is extended or adjusted under 35 U.S.C. 154(b) by 252 days.

(21) Appl. No.: 17/554,473

(22) Filed: Dec. 17, 2021

(65) Prior Publication Data

US 2022/0220799 A1 Jul. 14, 2022

(30) Foreign Application Priority Data

Jan. 14, 2021 (EP) ..................................... 21151572

(51) Int. Cl.

| | |
|---|---|
| ***E06B 7/10*** | (2006.01) |
| ***E06B 7/02*** | (2006.01) |
| *F24F 13/18* | (2006.01) |

(52) U.S. Cl.
CPC .................. *E06B 7/10* (2013.01); *E06B 7/02* (2013.01); *F24F 13/18* (2013.01)

(58) Field of Classification Search
CPC ...... E06B 7/10; E06B 7/14; E06B 7/02; F24F 13/18
USPC ............................................ 454/211; 52/209
See application file for complete search history.

(56) References Cited

U.S. PATENT DOCUMENTS 3,314,201 A * 4/1967 Riegelman ................ E06B 7/14 49/408
5,822,934 A * 10/1998 O'Donnell ................ E06B 7/14 52/214
6,374,557 B1 * 4/2002 O'Donnell ................ E06B 7/14 49/408

FOREIGN PATENT DOCUMENTS

| | | | | |
|---|---|---|---|---|
| BE | 1009282 A3 * | 1/1997 | ............. | E06B 1/003 |
| DE | 3427545 A1 * | 2/1986 | | |
| DE | 10335389 A1 * | 2/2005 | ............... | E06B 7/10 |
| DE | 202009017463 U1 | 3/2010 | | |
| DE | 202009017463 U1 * | 4/2010 | ............... | E06B 7/10 |
| DE | 202010016800 U1 | 3/2011 | | |
| DE | 202010016800 U1 * | 4/2011 | ............... | E06B 7/10 |
| EP | 2386710 A2 * | 11/2011 | ............... | E06B 7/14 |
| FR | 2981389 A1 * | 4/2013 | ............... | E06B 7/14 |

OTHER PUBLICATIONS

Extended European Search Report dated Jun. 25, 2021 for EP Application No. 21151572.1.

* cited by examiner

*Primary Examiner* — Avinash A Savani
*Assistant Examiner* — Frances F. Hamilton
(74) *Attorney, Agent, or Firm* — Vorys, Sater, Seymour and Pease LLP

(57) ABSTRACT

A ventilator for a window frame profile, the ventilator having an air intake opening and an air passage opening to ventilate a hollow member of a window frame profile, and a window frame profile system comprising a window frame profile and at least one such ventilator.

14 Claims, 5 Drawing Sheets

WINDOW FRAME VENTILATOR

The present invention relates to a ventilator and in particular a ventilation unit for ventilating a hollow part of a window frame.

It is known in the art that window frames may include hollow constructions or profiles, manufactured for example from aluminium extrusions or plastics like UPVC. The overall window frame houses a glazing unit such as a double- or triple-glazed unit, which is sealed. The glazing unit is held in place within the frame and there is a gasket between the glass and a rim of the frame which substantially prevents water and dirt from entering the hollow interior construction of the frame. In this description we will use the term "frame" to refer to the overall window frame and "profile" or "frame profile" to mean a part of the frame such as a side extrusion.

The sealing gasket is, in practice, not perfect and water can and does enter window frame profiles. To counter this, window frame profiles may be provided with drainage slots or so-called "weep holes" provided toward the bottom of a frame profile to allow water to escape. These weep holes may be provided on the front face of a frame profile, on the exterior of a building, or concealed under the lower-most edge of the frame profile. The weep holes may additionally allow air to enter the profile as well as to allow water to flow out.

The problem of water passing between the gasket and entering the frame profile may be caused by regular precipitation, especially if the gasket is not tightly sealed, but especially due to wind-driven rain or if the window is washed using high pressure water.

In order for trapped water to be drained away from the frame profile via the weep hole or weep holes, it is necessary to allow air to enter the hollow frame profile. This equalises pressure and therefore allows water to drain out under gravity. Without being ventilated, water would remain trapped inside the frame profile.

In practice, the type of ventilation to the window frame profile depends on the manner of construction of the frame profile and how the frame profile is installed in a building. In many window frame systems, holes are provided on the front face of a window frame profile to allow water drainage as explained above and also to allow air to enter the profile. Front-facing vents may, however, be considered unsightly and may disturb the aesthetic quality of the window frame. Front-facing vents also require caps or covers to prevent water and dirt from entering the frame profile. These easily fall off the frame profile and may be blocked with dirt.

However, in certain circumstances it was previously not possible to avoid the use of these caps. For example, in the United Kingdom, it is not possible to provide ventilation holes on the edges of window frame profiles, where the holes would be inconspicuous, due to the way that they are constructed and installed. In other countries with different installation interfaces, side-on venting may be possible but this is not always the case.

The present invention provides a solution to the inconvenient and unsightly front-facing drainage and ventilation holes in window frame profiles. In particular the invention provides a discrete method of ventilating window frame profiles which is architecturally pleasing and which may be applied to window frame profiles without the need for redesigning existing window frame systems. The ventilation holes provided by the invention are preferably slots which are inconspicuous and the ventilator of the invention allows for the provision of ventilation holes at the edge of a window frame profile where they are less visible.

Additionally the invention allows for a smaller number of ventilation points to be used per window. In the invention it is envisaged that two ventilation points may be provided per window frame. In contrast, in the art typically a window system with multiple panes of glass mounted in a frame would require two front-facing weep-holes per pane, which is unsightly. Furthermore in the present invention the ventilation holes are situated toward the wall of a building, in the shadow line of the building reveal or even in the interface seal.

Representative features are set out in the following clauses, which stand alone or may be combined, in any combination, with one or more features disclosed in the text and/or drawings of the specification.

According to the present invention, there is provided a ventilator (1) for a window frame profile (100), the ventilator comprising:

- a housing (2) having a front face (3), at least one side face (4), a top face (5) and a bottom face (6),
- wherein the front face is provided with an air intake opening (7) located in an area of the front face toward the bottom face,
- wherein the side face is provided with an air passage opening (8) located in an area of the side face toward the top face, and
- wherein the air passage opening is dimensioned and configured to allow a passage of air through a correspondingly dimensioned and configured opening (102) in a hollow side member (101) of the window frame profile.

Preferably the air passage opening is provided with an upstanding rim (9) dimensioned and configured for projecting through the window frame profile opening.

Advantageously the air intake opening is provided in a forward-protruding rim (10) on the front face so that the remaining front face is relatively recessed.

Conveniently the side face is further provided with a fixing means (11) for attaching the ventilator to a side portion of the window frame profile.

Preferably the fixing means comprises at least one longitudinal groove for engagement with a corresponding projection (103) of the window frame profile, wherein the longitudinal axis is defined in the direction between the top face and the bottom face.

Conveniently the at least one side face is substantially perpendicular to the front face.

Advantageously the housing is substantially rectangular in cross-section taken between the upper face and the bottom face and wherein the dimension of the front face is less than the dimension of the side face.

Preferably the ventilator further comprises a second side face (12) substantially parallel with the first side face and a back face (13) substantially parallel with the front face.

Conveniently the bottom face slopes downwardly in the direction of the front face.

Advantageously the air intake opening and/or the air passage opening are longitudinal slots.

The invention also provides a window frame system comprising a window frame profile (100) having at least one hollow side member (101) comprising an opening (102) and at least one ventilator (1) according to the invention, wherein the or each ventilator is engaged with the or each hollow side member such that the air passage opening (8) is aligned with and/or engaged with the hollow member opening to allow passage of air therethrough.

Preferably the window frame profile comprises two hollow side members and the system comprises a ventilator engaged with each hollow side member.

Conveniently the air intake opening is provided in a protruding rim (10) on the front face (3) and wherein the front edge of the rim is substantially flush with a front surface (104) of the window frame profile.

Advantageously the protruding rim is positioned adjacent to the front surface of the window frame profile.

Alternatively the protruding rim is seated in a corresponding cut-out portion (105) of the front surface.

The invention will now be described with reference to the accompanying drawings in which.

Figure 1:
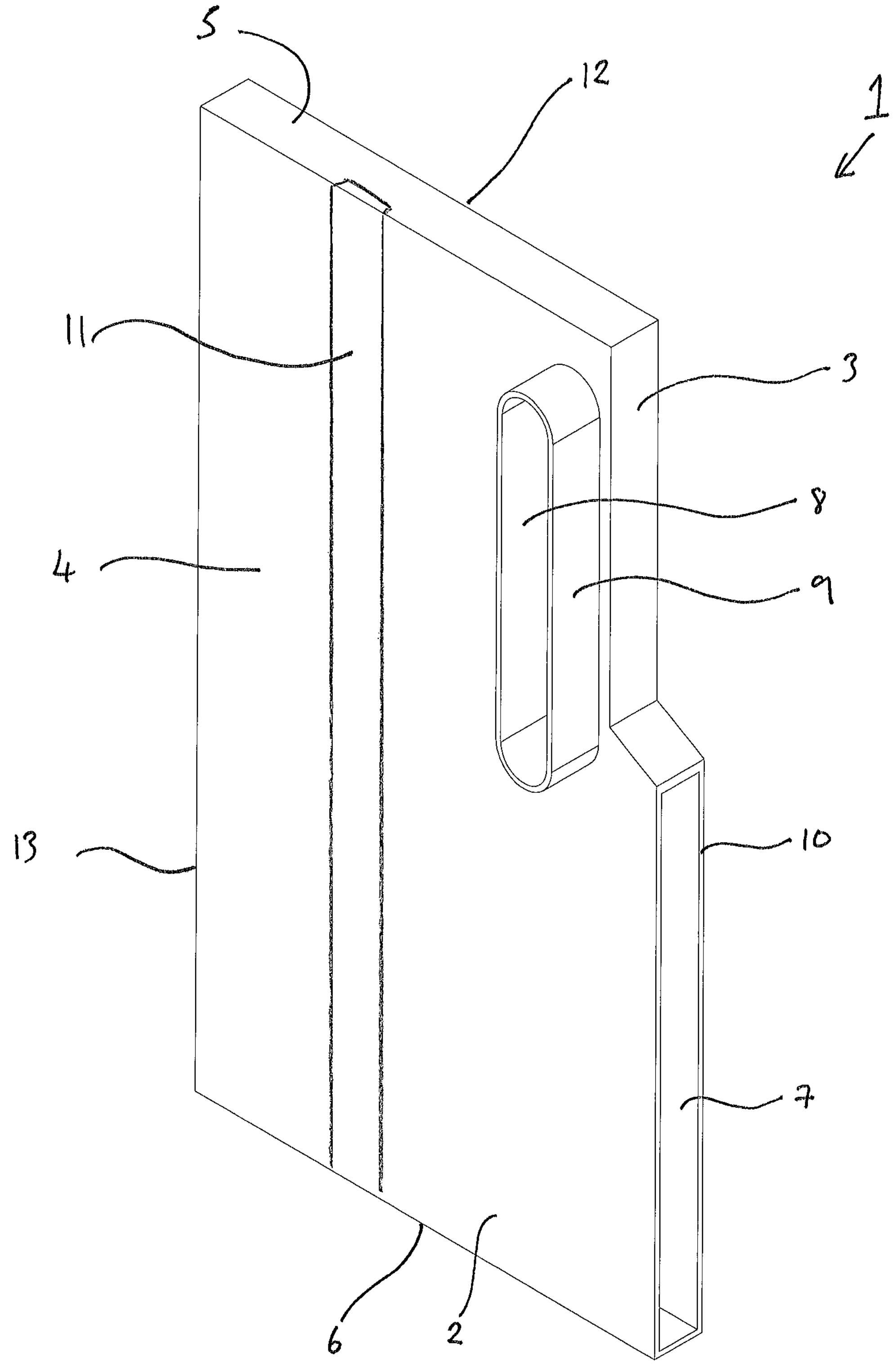
FIG. 1 is a perspective view of a ventilator in accordance with the present invention.

As shown in FIG. 1, the ventilator 1 of the present invention comprises a housing 2. The housing 2 is generally a sealed unit but has air inlets and outlets which will be described further below. As will be clear from the further discussion below, the ventilator 1 is designed to be installed to the side of a window frame profile 100. It is therefore advantageous that the ventilator 1 should have as narrow a profile as possible. To that end, the arrangement depicted in FIG. 1 is generally rectangular having a relatively narrow front face 3 and wider side faces 4 and 12. While not intending to limit the present invention to any particular dimensions, a suitable width (thickness) of the housing can be in the order of up to 10 mm and preferably 5 mm. The inventors have found that this thickness is sufficient to allow adequate air into the ventilator while still maintaining a discrete and low-profile air inlet.

The depth of the ventilator housing should be sufficient to provide a face which abuts with the side of a window frame profile element as described below, so as to provide a junction between the window frame profile element and the housing. Optionally, the housing can be deep enough so as to allow for a fixing means 11 for attaching the ventilator to the window frame profile.

As depicted, the housing is substantially rectangular so that the side faces are substantially perpendicular to the front face and rear face, but the invention is not limited to this arrangement. The housing should provide a front face which, in use, is parallel with the front face of a window frame profile installation. However the side face 4 does not necessarily need to be perpendicular to the front face 3, as long as it is dimensioned and configured to abut with a corresponding side face of the window frame profile to be ventilated. However, in practice, given that window frame profile installations are typically perpendicular arrangements, it is preferred that the front face 3 is substantially perpendicular to at least one side face 4.

The depicted ventilator 1 is intended for injecting air into the right-hand side of a window frame profile 100. Generally and as will be described below, air enters the housing via the air intake opening 7 provided in the front face 3 of the housing 2, being substantially parallel with a front face of the window frame profile system. Air passes through the housing 2 and is inserted into the window frame profile out of the air passage opening 8 in the side face. Thus, this ventilator is intended for placement to the right side of a window frame profile 100, with air to be injected through the right side. The remaining FIGS. 2 to 5 illustrate a ventilator 1 according to the invention intended to similarly inject air into a window frame profile via the right hand side of the window frame profile.

Returning to FIG. 1, it can be seen that the front face 3 is provided with an air intake opening 7. Preferably and as shown, the air intake opening 7 is in the form of a longitudinal slot i.e. a slot which travels over the height of the housing. The air intake opening 7 may simply be provided on the front face of the housing but, as shown, the air intake opening 7 is provided in a protruding rim 10 on the front face. This is advantageous because the region of the front face which is not part of the protruding rim is, in consequence, recessed. Therefore when the ventilator 1 is installed against the window frame profile 100, the non-rim recessed area of the front face can be filled with sealant material 106 as shown in FIGS. 2 to 6. Therefore in the arrangement of FIG. 1, the only visible part of the ventilator 1 once the ventilator 1 is installed is the rim 10 of the air intake opening 7.

In this regard, when the air intake opening 7 is provided in an upstanding rim 10 on the front face 3, the width of the air intake opening 7 is substantially the same as the width of the housing (less the thickness of the material constituting the sidewalls). However it is not necessary that the width of the air intake opening 7 be substantially the same as the width of the housing. Rather, the width of the air intake opening 7 can be any width sufficient to allow entry of air into the housing and ultimately into the window frame profile.

Likewise the height of the air intake opening 7 should be adequate to allow air into the housing and then into the window frame profile 100 to be ventilated. While not wishing to be limited to any particular dimensions, the present inventors have found that a height of around 30 to 60 mm is adequate.

The air intake opening 7 may be described as a slot, meaning being a narrow aperture having a height greater than its width (which may be up to 10 mm and preferably around 5 mm) and preferably a height several times greater than its width.

Preferably the air intake opening 7 should extend right down to the bottom face 6 of the housing. This is to prevent water (from condensation or rain) from becoming trapped inside the housing 6. For example, if the air intake opening 7 did not extend right down to the bottom face 6 of the housing 2, the housing 2 would effectively present a trough which could contain water.

Although not shown in the drawings, it is also envisaged that the bottom face 6 of the housing may be sloped downwardly in the direction of the front face 3. Therefore if any water was to enter the housing, for example due to driving rain, such water would flow out of the housing through the air intake opening 7. However it may be preferred for the bottom face 6 to be substantially perpendicular to the other faces so that the overall housing 2 is cuboid. This is because, as above, window frame profile constructions are often rectangular so that the housing 2 should present a perpendicular face. Nevertheless should the bottom face 6 present a sloped surface this can also be achieved by including a sloped insert or sloped solid portion of housing (not illustrated).

Before moving on to discuss the air passage opening 8 in detail, it should be noted that the air passage opening 8 is located higher up on the housing 2 than the air intake opening 7. This refers to the height of the ventilator 1 in the intended installed position. Thus the air intake opening 7 is located in an area of the front face 3 toward the bottom face 6 (and preferably meets with the bottom face 6 as described above) whereas the air passage opening 8 is located in an area on the side face 4 that is toward the upper face 5 of the housing 2. The air passage opening 8 does not necessarily need to contact with the top face 5 because the same water draining effect is not required for the air passage opening 8. When referring to "an area toward the bottom or top face" it is generally meant that the openings are located relatively close to the bottom or top faces respectively, that is closer to the top face than the bottom face or closer than the bottom face than the top face. In general, when the housing 2 has a height, the air intake opening 7 may be provided in a position below half-height of the front face 3 and the air passage opening 8 may be provided in a position above half-height of the side face 4.

While not wishing to be limited to particular dimensions, the housing should be tall enough i.e. have a height great enough to prevent water from entering the housing to via the air intake opening and passing into the window frame profile via the air passage opening. The present inventors have found that a suitable height for the overall housing construction is approximately 80-100 mm and preferably 90 mm. Additionally the inventors found that the housing can optionally be provided with internal baffles (projections projecting from alternate interior sides of the housing) to help deflect water carried by air and prevent water from entering the profile.

As illustrated in FIG. 1, the air passage opening 8 is essentially an opening in the side face 4 of the housing 2. As shown, the air passage opening 8 is provided with an upstanding rim 9, which will be described in more detail below. However it is not necessary that the air intake opening 9 should have any upstanding rim or other similar upstanding features. All that is necessary is for the aperture of the air passage opening 8 to line up with a correspondingly dimensioned and configured opening in a hollow member of the window frame profile.

Figure 2:
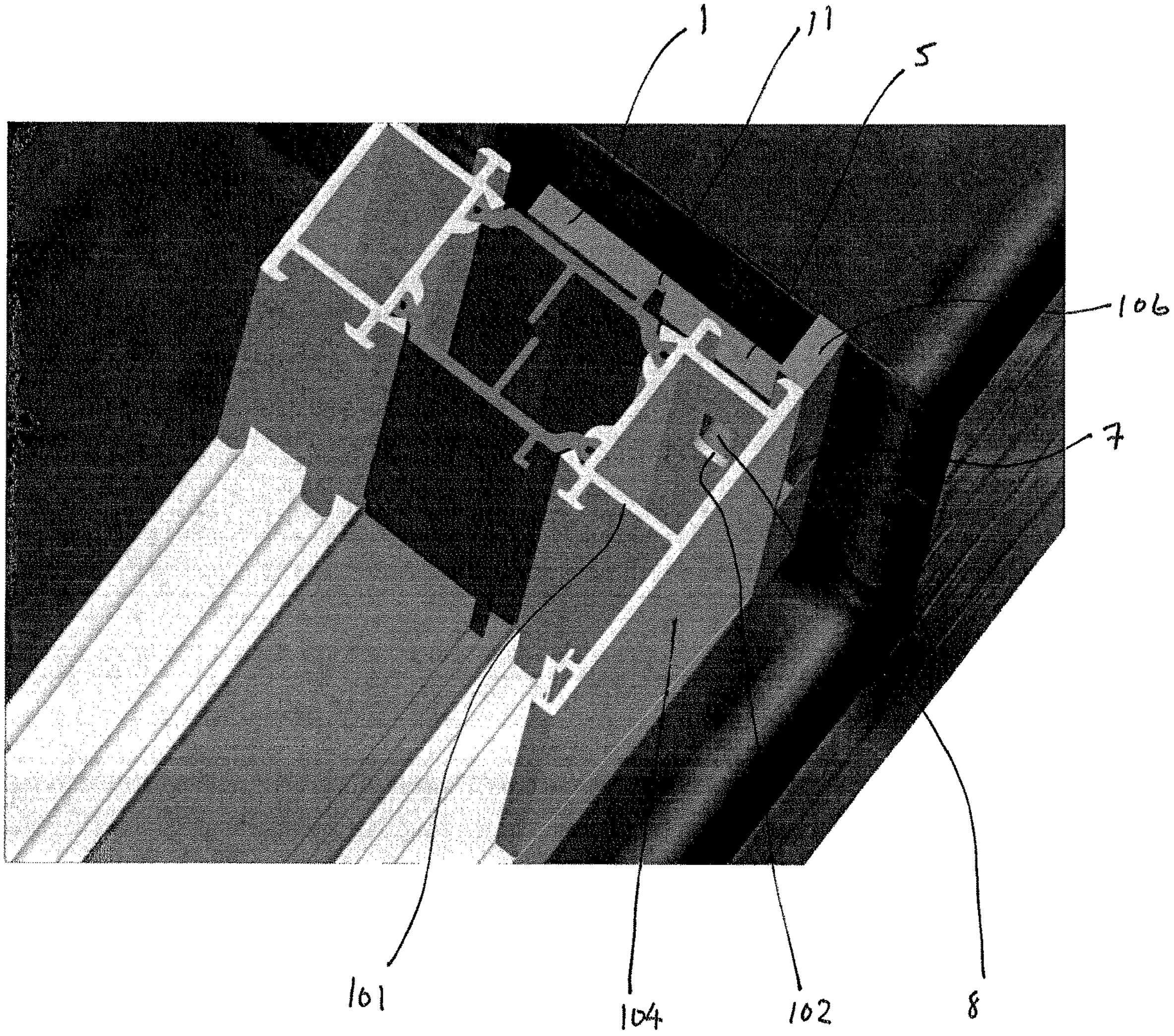
FIG. 2 is a perspective view of the ventilator of FIG. 1 installed in a window cavity.
Figure 5:
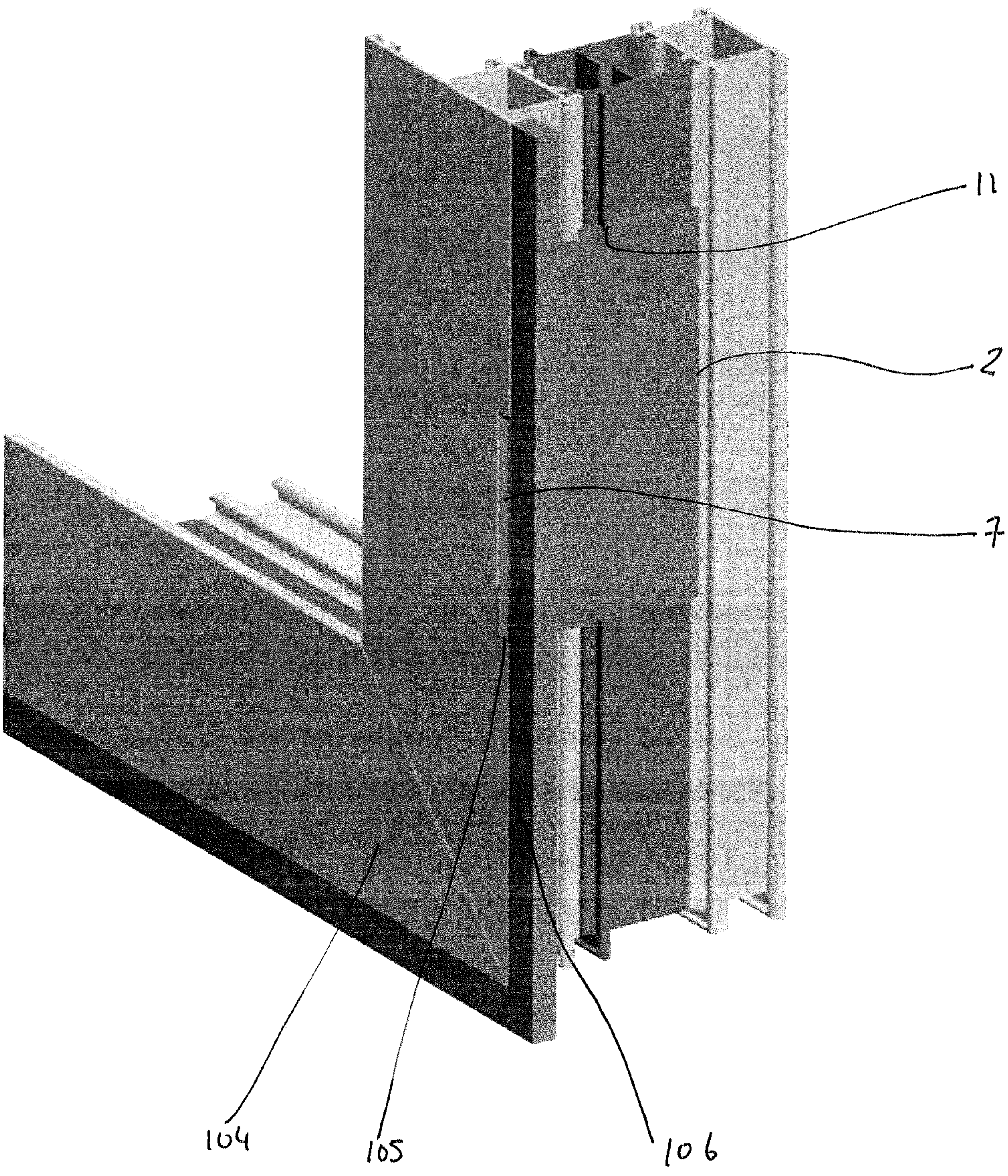
FIG. 5 is a different perspective view of the arrangement of FIG. 4.

As shown in FIGS. 2, 5 and 6 the window frame profile assembly includes a hollow member 101. This is the region of the window frame profile which needs to be ventilated to allow pressure equalisation so that water can escape, as already explained above in the background of the invention. This hollow member 101 may be an aluminium extrusion. As shown this hollow member 101 also prevents a front surface 104 of the window frame profile, which may also be aluminium. Thus the front surface 104 is visible on an exterior or interior of a building and the remainder of the hollow member 101 is hidden within the window frame profile construction.

As shown in FIG. 2, the hollow member 101 has an opening or aperture 102 which forms an air passage together with the air passage opening 8 of the ventilator 1. This opening 102 may be pre-formed in the hollow member 101 or may be drilled out or otherwise formed in the hollow member 101 during installation, to match the air passage opening 8 of the ventilator 1. As depicted the opening 102 and the air passage opening 8 are also slot-like and rounded but this is just illustrative and in practice the opening can be of any shape or dimension, although again slots (elongate apertures) are preferred.

Figure 4:
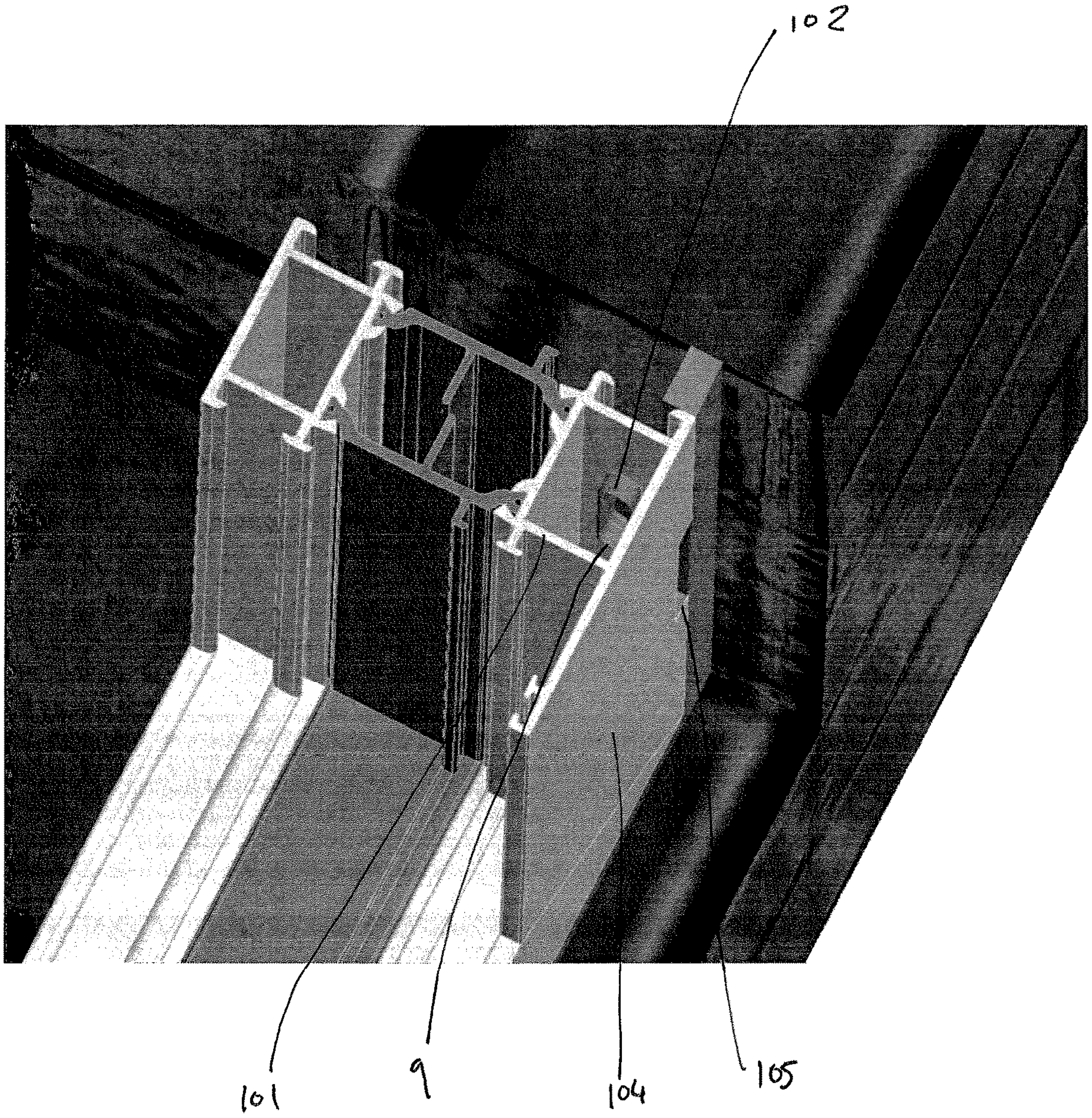
FIG. 4 is a perspective view of an alternative arrangement of the ventilator of the invention installed in a window cavity.

As given in FIG. 1, the air passage opening 8 is provided with an upstanding rim 9 which is dimensioned and configured for projecting through the opening 102 in the hollow member 101 of the window frame profile 100. The rim may project up to 10 mm from face 4 and preferably around 5 mm. This is preferred because the upstanding rim 9 allows for a positive engagement of the ventilator 1 through the opening 102 of the window frame profile, as shown in FIG. 4.

As shown in FIG. 2 the housing 2 abuts the side of the window frame profile construction including abutting against the hollow member 101 of the window frame profile. The ventilator 1 may be installed for example by gluing. Additionally or as an alternative, the housing 2 of the ventilator 1 may be provided with a fixing means for allowing a mechanical fixing between the housing 2 and the window frame profile 100. For example, as depicted, the window frame profile 100 presents a substantially T-shaped rail 103 and the housing 2 is provided with a longitudinal groove for engaging with corresponding projection 103 (rail) of the window frame profile. Therefore during installation, the groove 11 can be lined up with the projection 103 and slid along the projection to the base of the window frame profile arrangement. However, other mechanical fixing means are contemplated and may be used.

Figure 3:
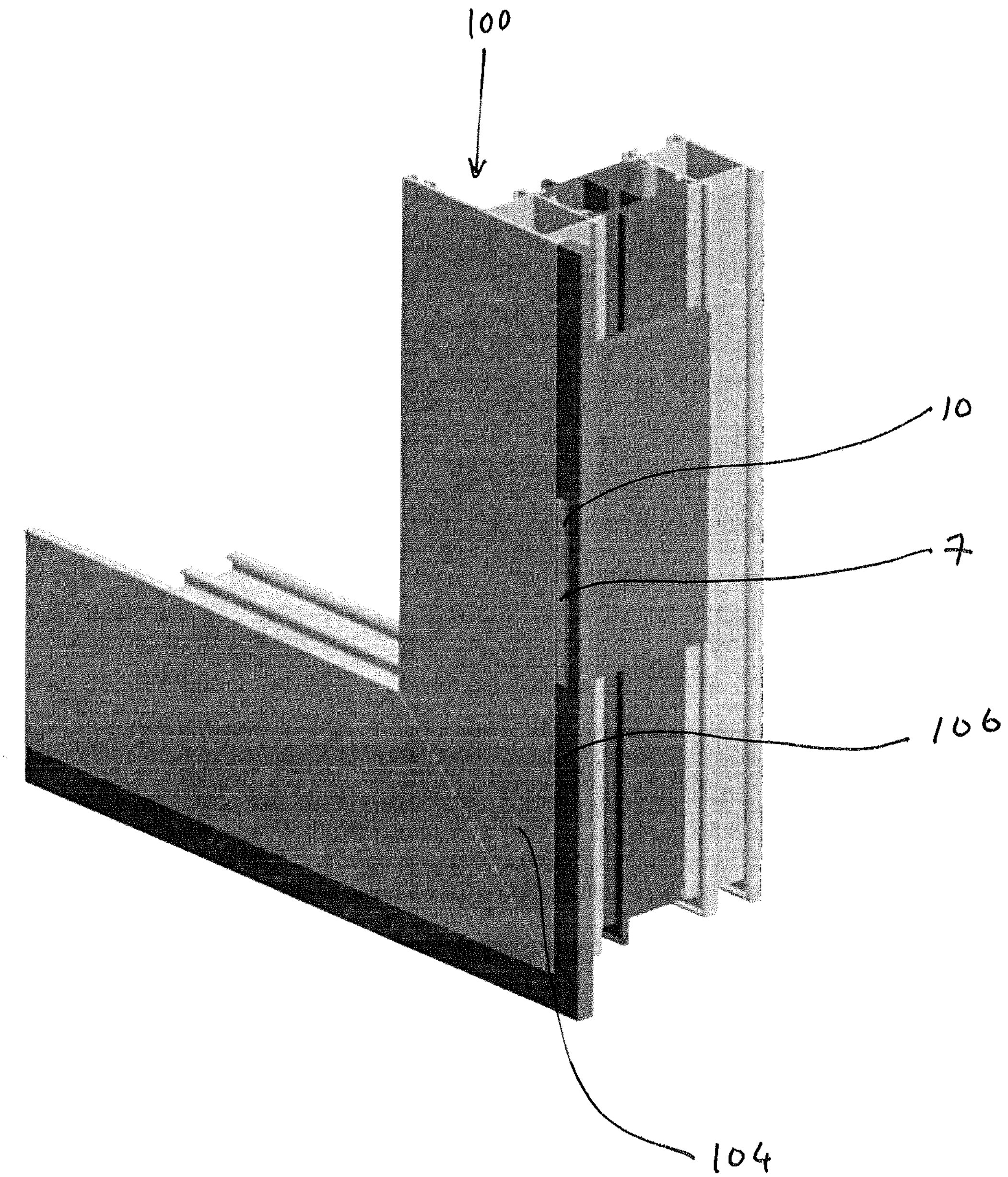
FIG. 3 is a different perspective of the arrangement of FIG. 2.

In the arrangement depicted in FIGS. 2 and 3, the housing 2, when installed, is placed against the side of the window frame profile 100 so that the air intake opening 7 is presented to the right-hand side of the window frame profile 100 i.e. the air intake opening 7 extends to the side of the window frame profile to the extent of the thickness of the housing. As shown in FIG. 3 in an installed state, the area between the window frame profile 100 and a wall is typically filled with sealant material 106 and this also surrounds the air intake opening 7, providing discrete ventilation. As already explained, as the air intake opening 7 projects forward from the rest of the housing front face the remainder of the front face is recessed in comparison and may be filled with sealant.

The housing 2 including the air intake opening 7 may be constructed of plastic or any other suitable material such as aluminium or fibreglass. Preferably the colour of the material used to manufacture the air intake opening matches either the colour of the finished window frame profile 100 or the colour of the sealant. For example, typically a sealant may be black, white or anthracite in colour and the air intake opening 7 may be a corresponding colour so that the air intake opening 7 does not visually disturb.

In an alternative arrangement depicted in FIG. 4, the window frame profile 100 is provided with a cut-out portion 105 which is of a corresponding dimension to the air intake opening 7. Therefore the ventilator 1 is still seated against the side of the window frame profile 100 but rather than the air intake opening 7 extending beyond the periphery of the window frame profile (as in FIG. 3) the air intake opening is presented at the periphery but within the boundary of the window frame profile 100. Therefore if a customer prefers to have the ventilating slot in the window frame profile material itself rather than outside of the periphery of the window frame profile, the present invention also makes this possible. This may also be useful where there is no or insufficient sealing material 106 around the periphery of the window frame profile.

The present invention provides the ventilator 1 herein described as a separate item. The ventilator 1 can be installed against already manufactured window frame profiles 100 without further modification other than the requirement to provide an aperture in the side of a hollow member to be ventilated, to correspond with the air passage opening 8 of the housing. That is, the ventilator 1 can be fitted to window frame systems purchased off-the-shelf that are not specially manufactured to match the ventilator.

Additionally the invention provides a window frame system which includes the window frame profile 100 having at least one hollow side member 101 having an opening 102 for forming an air passage with the air passage opening of a ventilator, and the ventilator. The present invention also envisages a kit comprising a window frame system or components required to construct a window frame system together with at least one ventilator 1 as herein described and optionally a sealant material 106.

It is to be appreciated that a particular window frame system (having two sides and top and bottom profiles of the frame) may be provided with more than one ventilator 1. For example, it may be preferable to include two ventilators, one provided on each side (left and right) of the window frame profile so as to ventilate hollow members on each side of the window frame. It is also envisaged to include more than two ventilators, for example two further ventilators located higher up on the window frame profile to provide four ventilators in total to a single window frame.

The ventilator(s) of the invention may, in use, be mounted on any side of a window frame i.e. any of the top, bottom or side profiles, as desired. The accompanying drawings show side mountings but this is not limiting. However side mounting may be preferred because, as explained the height of the ventilator front face prevents water ingress. Also the ventilator(s) may be mounted at any point along a given profile, depending on aesthetic need.

Furthermore while the ventilators of the present invention have been described and depicted as facing an exterior of a building it is also possible for the ventilators to face an interior of a building, that is, the air intake opening or openings may be located at the interior of a building.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

The invention claimed is:

1. A ventilator for a window frame profile, the ventilator comprising:

a housing having a front face, at least one side face, a top face and a bottom face, wherein the front face is provided with an air intake opening located in an area of the front face toward the bottom face, and the front face is configured to face an exterior of the window frame profile, wherein the air intake opening is defined by a forward-protruding rim on the front face such that remaining portions of the front face are recessed, wherein the side face is provided with an air passage opening located in an area of the side face toward the top face, and wherein the air passage opening is alignable with an opening defined in a hollow side member of the window frame profile and dimensioned and configured to allow a passage of air through the opening defined in the hollow side member.

2. The ventilator of claim 1 wherein the air passage opening provides an upstanding rim dimensioned and configured for projecting through the opening defined in the hollow side member.

3. The ventilator of claim 1 wherein the side face is further provided with a fixing means for attaching the ventilator to a side portion of the window frame profile.

4. The ventilator of claim 3 wherein the fixing means comprises at least one longitudinal groove defined in the side face for engagement with a corresponding projection of the window frame profile, wherein the longitudinal groove extends along a longitudinal axis defined in the direction between the top face and the bottom face.

5. The ventilator of claim 1 wherein the at least one side face is substantially perpendicular to the front face.

6. The ventilator of claim 1 wherein the housing is substantially rectangular in cross-section taken between the upper face and the bottom face, and wherein a dimension of the front face is less than a dimension of the side face.

7. The ventilator of claim 1 further comprising a second side face substantially parallel with the side face and a back face substantially parallel with the front face.

8. The ventilator of claim 1 wherein the bottom face slopes downwardly in the direction of the front face.

9. The ventilator of claim 1 wherein the air intake opening and/or the air passage opening are longitudinal slots.

10. A window frame system comprising:

a window frame profile having at least one hollow side member comprising an opening; and at least one ventilator according to any preceding claim, wherein the at least one ventilator is engaged with the at least one hollow side member such that the air passage opening is aligned with and/or engaged with the hollow member opening to allow passage of air therethrough, and wherein the air intake opening is defined by a forward-protruding rim on the front face such that remaining portions of the front face are recessed.

11. The system of claim 10 wherein the window frame profile comprises two hollow side members and the system comprises a ventilator engaged with each hollow side member.

12. The system of claim 10 wherein a front edge of the forward-protruding rim is substantially flush with a front surface of the window frame profile.

13. The system of claim 12 wherein the protruding rim is positioned adjacent to the front surface of the window frame profile.

14. The system of claim 12 wherein the protruding rim is seated in a corresponding cut-out portion of the front surface.

* * * * *